US011397351B2

(12) United States Patent
Inoue et al.

(10) Patent No.: US 11,397,351 B2
(45) Date of Patent: Jul. 26, 2022

(54) DISPLAY DEVICE

(71) Applicant: SHARP KABUSHIKI KAISHA, Sakai (JP)

(72) Inventors: Naoto Inoue, Sakai (JP); Naoko Goto, Sakai (JP); Tomoyuki Nara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/392,934

(22) Filed: Aug. 3, 2021

(65) Prior Publication Data
US 2022/0043302 A1 Feb. 10, 2022

Related U.S. Application Data

(60) Provisional application No. 63/063,099, filed on Aug. 7, 2020.

(51) Int. Cl.
G09G 3/34 (2006.01)
G02F 1/13357 (2006.01)
G09G 3/32 (2016.01)

(52) U.S. Cl.
CPC ......... *G02F 1/133603* (2013.01); *G09G 3/32* (2013.01); *G09G 3/3406* (2013.01); *G09G 2310/0237* (2013.01); *G09G 2310/08* (2013.01); *G09G 2320/064* (2013.01)

(58) Field of Classification Search
CPC ......... G09G 2320/064; G09G 2310/08; G09G 3/3406
See application file for complete search history.

(56) References Cited

U.S. PATENT DOCUMENTS

| 2009/0262065 | A1* | 10/2009 | Shin | G09G 3/3611 |
| | | | | 349/61 |
| 2013/0120478 | A1* | 5/2013 | Ishihara | G09G 3/2022 |
| | | | | 345/690 |
| 2015/0206484 | A1 | 7/2015 | Gotoh | |
| 2017/0256211 | A1* | 9/2017 | Miyata | G09G 3/3618 |
| 2020/0081679 | A1* | 3/2020 | Im | G02B 6/4298 |
| 2021/0020114 | A1* | 1/2021 | Lee | G09G 3/342 |

FOREIGN PATENT DOCUMENTS

| JP | 2013-045740 A | 3/2013 |
| JP | 2014-026006 A | 2/2014 |

* cited by examiner

*Primary Examiner* — Andrew J Coughlin
(74) *Attorney, Agent, or Firm* — ScienBiziP, P.C.

(57) ABSTRACT

In a display device, a drive circuit drives LEDs arranged in n rows (n is an integer equal to or greater than two) so as to correspond to a plurality of areas of a backlight, row by row through division into n time slots or every k rows (k is an n's divisor equal to or greater than two and is smaller than n) through division into n/k time slots in accordance with the status of use of the display device.

11 Claims, 6 Drawing Sheets

FIG.2
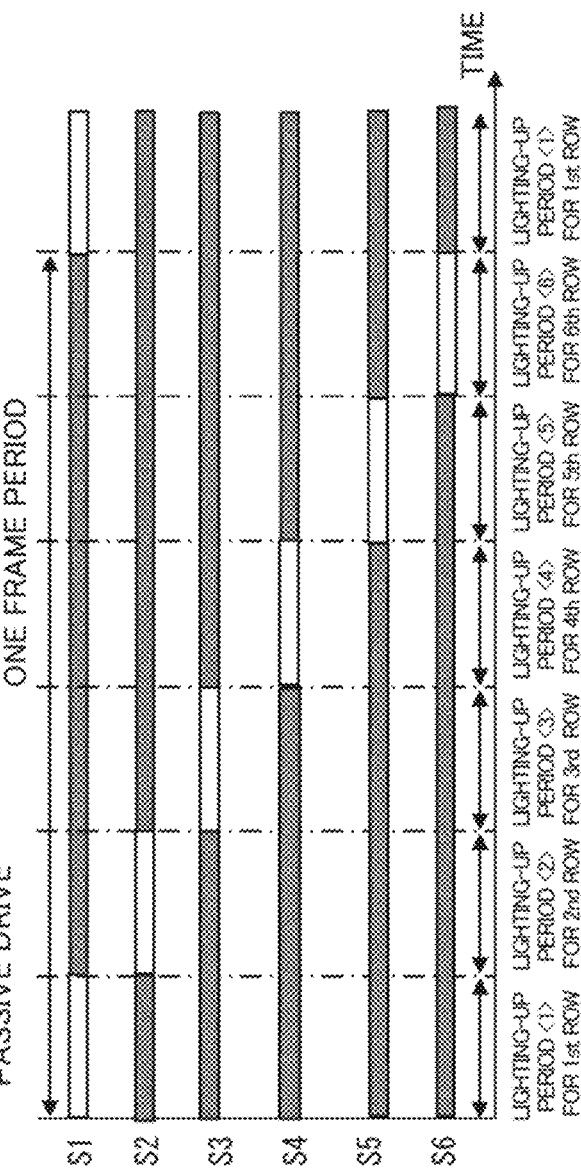
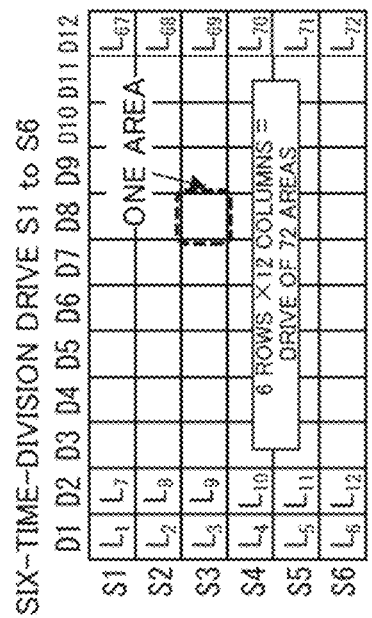

FIG.4
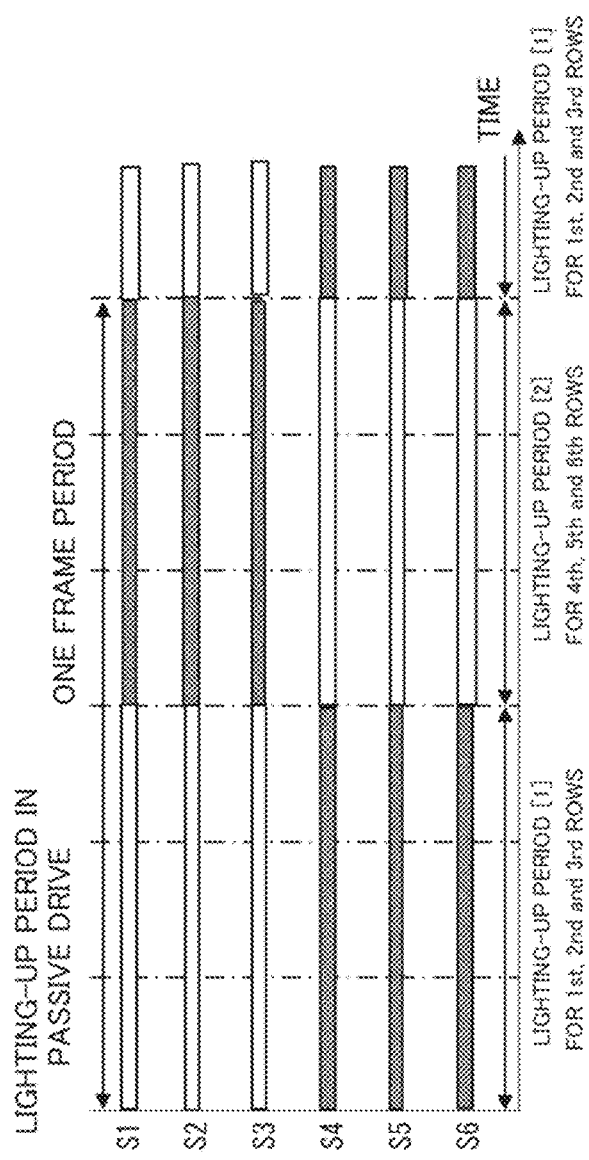
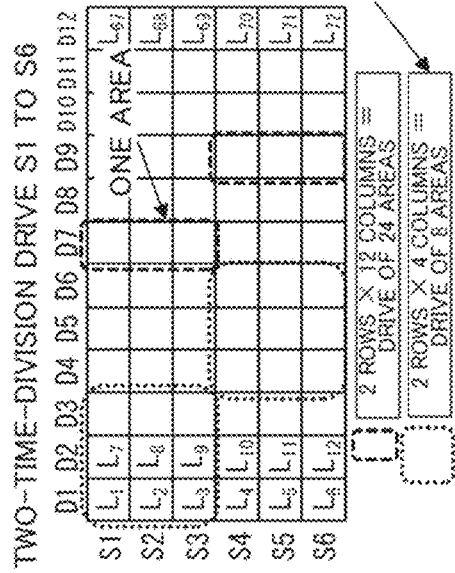

FIG.6
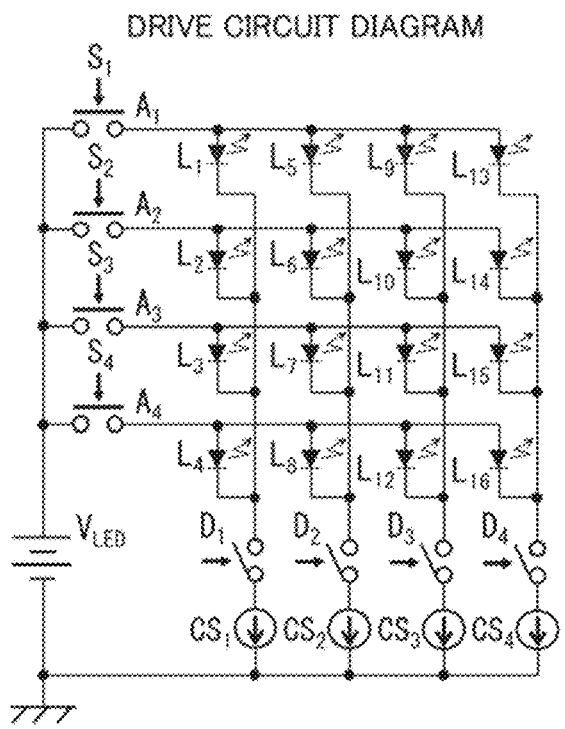
DRIVE CIRCUIT DIAGRAM
TIMING CHART
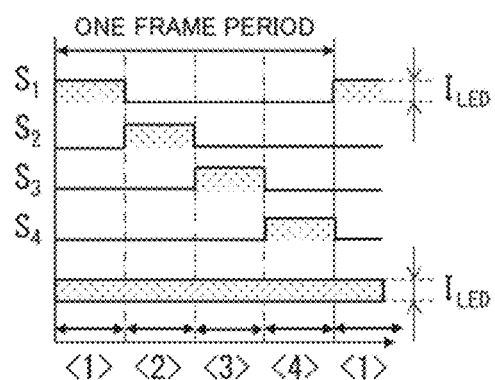

DISPLAY DEVICE

CROSS REFERENCE TO RELATED APPLICATION

The present application claims priority from U.S. Provisional Application No. 63/063,099, filed Aug. 7, 2020, the entire contents of which are hereby incorporated by reference into this application.

BACKGROUND

Technical Field

The disclosure relates to a display device.

Description of the Related Art

Local dimming is a technique that is used in a liquid crystal display (LCD) having a plurality of light sources in a backlight. The technique includes dividing the light sources into a plurality of areas and controlling, every one frame period, the emission brightness of the light sources within the divided areas on the basis of image data in display regions on the liquid crystal panel corresponding to the divided areas. Ultra-multi-division local dimming is performed through a method called passive drive.

Passive drive includes connecting LEDs corresponding to, for instance, four areas out of 16 areas to one channel of an LED driver (i.e., an LED drive circuit) to perform time-division drive (time sharing in the LED driver). This can simplify wiring and reduce the number of channels in the LED driver.

Reference is made to an instance where LEDs in 16 areas (i.e., four areas widthwise by four areas lengthwise) are driven through division into four time slots. FIG. 6 illustrates the instance. As illustrated in FIG. 6, the cathode terminals of four LEDs are connected to one channel of an LED driver, and voltage application to the anode terminal of each LED is switched by time division.

As described above, driving LEDs separately every one-quarter of 16 areas (i.e., four areas each) enables a backlight with 16 areas to be driven using an LED driver having a quarter number of channels (i.e., four channels).

Japanese Patent Application Laid-Open No. 2014-26006 discloses a display device that turns on and off a plurality of light emitters in some groups separately. The literature also discloses dividing the cycle of a vertical synchronous signal into as many periods as the number of light emitter groups and turning on and off the light emitters for each group sequentially.

Moreover, Patent Application Laid-Open No. 2013-45740 discloses variably controlling at least one of the duty ratio and current value of a PWM signal for each switching operation in such a manner that the brightness of LED blocks connected to switches corresponding to respective divided areas conforms to images that are to be displayed in the respective divided areas.

SUMMARY

Unfortunately, to use the LED driver in four-time division, one cannot light up the backlight brightly, because the maximum duty ratio of a PWM signal that is usable by an LED in one area is only one-quarter (25%).

This problem is caused because one channel of the LED driver undergoes time-division drive. Individual drive with less LED driver channels than the number of areas absolutely requires time sharing in the LED driver.

To be specific, for drive through division into n time slots, the number of LED driver channels is one-nth of the number of areas, and the duty ratio of a PWM signal that is usable per cycle by an LED in a particular area is also one-nth at maximum. That is, the LEDs remain lit up for a shorter time period than those at 100% of duty ratio. Hence, n-time-division drive involves a darker backlight than a method of normal LED drive that does not use time division.

It is one aspect of the disclosure to light up a backlight brightly when light-emitting elements undergo time-division drive.

(1) One aspect of the disclosure provides a display device that includes light-emitting elements disposed in a backlight divided into a plurality of areas. The light-emitting elements are arranged in a plurality of rows and a plurality of columns so as to correspond to the plurality of respective areas. The display device also includes a driver that sequentially drives the light-emitting elements in one or more rows every predetermined time period that has undergone time division from one frame period. The one frame period is a time period during which the display device displays one frame of an image. The driver drives the light-emitting elements arranged in n rows by using a driving method based on a predetermined condition. The driving method includes driving the light-emitting elements row by row through division into n time slots, or driving the light-emitting elements every k rows through division into n/k time slots, where n is an integer equal to or greater than two, where k is an n's divisor equal to or greater than two and is smaller than n.

(2) One aspect of the disclosure provides a display device that includes light-emitting elements disposed in a backlight divided into a plurality of areas. The light-emitting elements are arranged in a plurality of rows and a plurality of columns so as to correspond to the plurality of respective areas. The display device also includes a driver that sequentially drives the light-emitting elements in one or more rows every predetermined time period that has undergone time division from one frame period. The one frame period is a time period during which the display device displays one frame of an image. The driver drives the light-emitting elements arranged in n rows by using a driving method. The driving method includes driving the light-emitting elements row by row through division into n time slots during a part of the predetermined time period, and driving the light-emitting elements every k rows through division into n/k time slots during the other part of the predetermined time period, where n is an integer equal to or greater than two, where k is an n's divisor equal to or greater than two and is smaller than n.

(3) In the display device according to one preferred embodiment of the disclosure, the driver, in addition to Configuration (2), changes the driving method so as to change the part and other part of the predetermined time period in accordance with a predetermined condition.

(4) In the display device according to another preferred embodiment of the disclosure, the driver, in addition to Configuration (1) or (3), changes the driving method in accordance with a setting of the screen brightness level of the display device.

(5) In the display device according to sill another preferred embodiment of the disclosure, the driver, in addition to any of Configurations (1), (3) and (4), changes the driving method in accordance with an application used in the display device.

(6) In the display device according to further another preferred embodiment of the disclosure, the driver, in addition to any of Configurations (1), (3), (4) and (5), changes the driving method in accordance with the power source status of the display device.

(7) in the display device according to still further another preferred embodiment, the driver, in addition to any of Configurations (1), (3), (4), (5) and (6), further drives the light-emitting elements every multiple columns when driving the light-emitting elements every k rows through the n/k-time division, where k is an n's divisor equal to or greater than two and is smaller than n.

The aspect of the disclosure enables the backlight to be lit up brightly when the light-emitting elements undergo time-division drive.

BRIEF DESCRIPTION OF DRAWINGS

FIG. 2 illustrates a basic method of LED drive according to the first preferred embodiment of the disclosure;

FIG. 4 illustrates a method of LED drive through division into two time slots according to a second preferred embodiment of the disclosure;

FIG. 6 illustrates an example method of LED drive through division into four time slots according to a conventional technique.

DETAILED DESCRIPTION OF THE DISCLOSURE

First Preferred Embodiment

The following details a first preferred embodiment of the disclosure.

Configuration of Display Device 1

Figure 1:
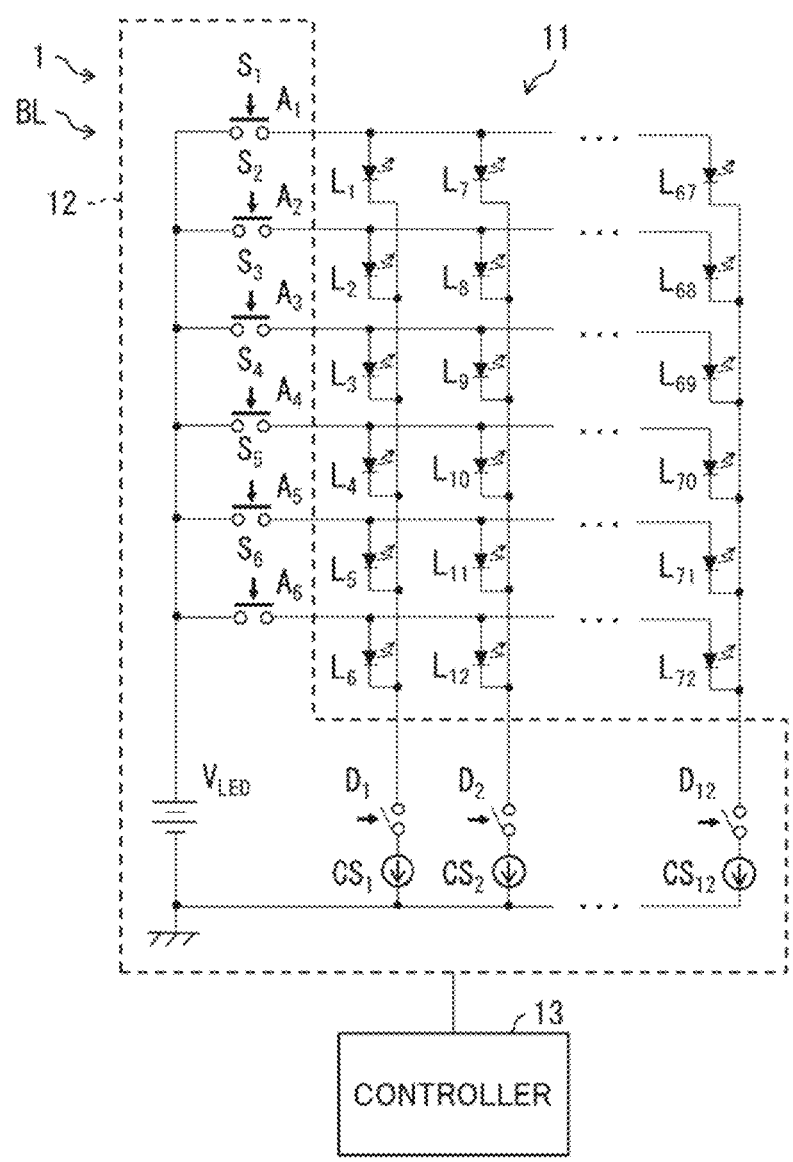
FIG. 1 illustrates the configuration of a display device according to a first preferred embodiment of the disclosure.

FIG. 1 illustrates the configuration of a display device 1 according to the preferred embodiment. FIG. 1 particularly shows the configuration of a backlight BL of the display device 1. The display device 1 has LEDs (i.e., light-emitting elements) 11 as a light source of the screen backlight BL.

As illustrated in FIG. 1, the backlight BL includes the LEDs 11, a drive circuit (driver) 12, and a controller 13. The LEDs 11 are arranged in six rows (a plurality of rows) and 12 columns (a plurality of columns) in the backlight BL divided into a plurality of areas so as to correspond to the respective areas. The LEDs 11 consist of 72 LEDs, L1 to L72.

The drive circuit. 12 drives the LEDs 11 in one or more rows sequentially every predetermined time period that has undergone time division from one frame period, which is a time period during which the display device 1 displays one frame of an image. The details will be described later on.

The controller is a microcontroller, for instance, that changes a setting on the drive circuit 12.

As illustrated in FIG. 1, the drive circuit 12 includes a voltage source VLED, switches S1 to S6, drivers D1 to D12, and current sources CS1 to CS12. The voltage source VLED is provided for applying direct voltage to the LEDs 11. The switches S1 to S6 are connected to the anode terminals of the respective LEDs and control ON and OFF of voltage application to the LEDs for each row. The drivers D1 to D12 are connected to the cathode terminals of the respective LEDs and control ON and OFF of voltage application across the LEDs in each column. The current sources CS1 to CS12 are connected between the drivers D1 to D12 and a ground terminal and controls current flowing through the channels of the respective drivers. The current sources CS1 to CS12 can control current values individually.

The backlight BL that performs local dimming with so many numbers of divisions uses passive drive, as illustrated in FIG. 1, to reduce the number of drive channels in the LED drivers.

FIG. 1 shows an LED substrate with 6 rows×12 columns=72 light source areas. As illustrated in FIG. 1, the cathode terminals of the longitudinal LEDs (L1 to L6) are tied into a bundle and connected to the channel of the first driver, D1. Likewise, the cathode terminals of the longitudinal LEDs (L7 to L12) are tied into a bundle and connected to the channel of the driver D2, and the cathode terminals of the longitudinal LEDs (L67 to L72) are tied into a bundle and connected to the channel of the driver D12. The anode terminals (A1 to A6) of the lateral LEDs are tied into a bundle individually and connected to the switches S1 to S6.

In this method of connection, the number of drive channels in the drivers D is one-sixth of the 72 areas, that is, 12 drive channels, and the number of switches S for the anodes is six.

Outline of Operation of Drive Circuit 12

In the backlight BL that performs ultra-multi-division in time-division passive drive, the controller 13 uses a communication system, such as an inter-integrated circuit (I2C), to control the drive circuit 12 to increase power input to the backlight BL and decrease the number of divisions. The controller 13 performs this processing statically (for instance, when a menu, an HDR mode, or other things switches) by using the following method. It is noted that the details of the value k will be described later on.

(1) Increasing direct current in the drivers D1 to D12 by k times; and (2) Turning on the switches S1 to S6 in units of multiple switches (k switches) simultaneously The controller 13 controls the drive circuit 12 to decrease the number of divisions in accordance with a predetermined condition. The predetermined condition will be described later on.

Detailed Operation of Drive Circuit 12

The drive circuit 12 according to this preferred embodiment drives the LEDs 11 arranged in n rows (n is an integer equal to or greater than two) row by row through division into n time slots in accordance with the predetermined condition (this is a basic driving method), or every k rows (k is an n's divisor equal to or greater than two and is smaller than n) through division into n/k time slots in accordance with the predetermined condition.

In these driving methods, the LEDs 11, when undergoing time-division drive, are driven every multiple (k) rows, thereby enabling the backlight BL to be lit up k times more brightly.

It is noted that the drive circuit 12 may further drive the LEDs 11 every multiple rows when driving them every k rows (k is an n's divisor equal to or greater than two and is smaller than n) through division into n/k time slots.

Basic Driving Method

FIG. 2 illustrates a basic method of driving the LEDs 11 according to the preferred embodiment. FIG. 2 shows a specific example method of driving the LEDs 11 arranged in six rows, row by row through division into six time slots. That is, the drawing provides an instance where n=6, k=1, and n/k=6 are satisfied.

Figure 3:
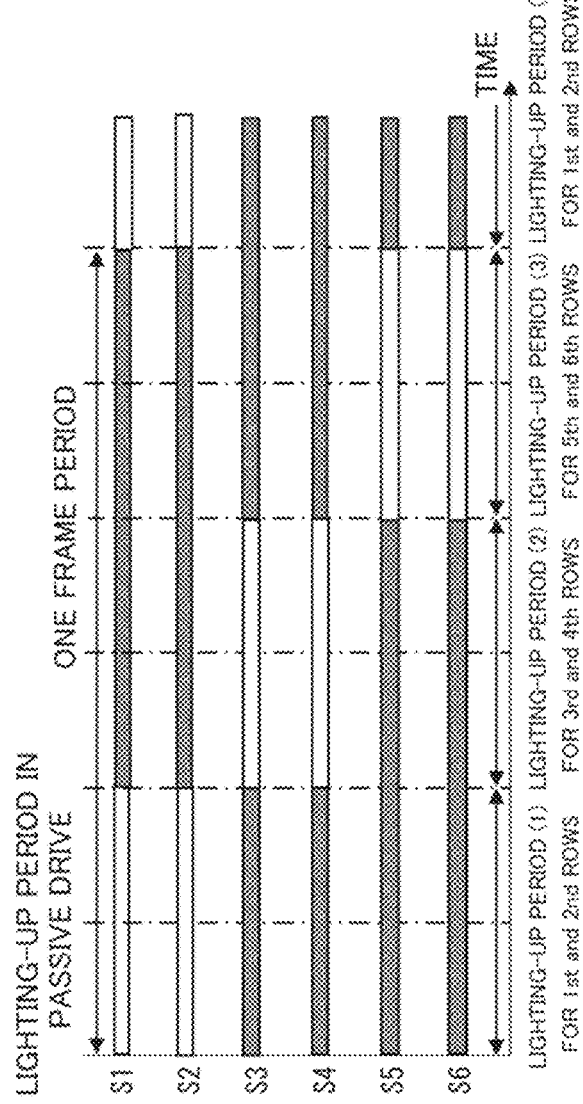
FIG. 3 illustrates a method of LED drive through division into three time slots according to the first preferred embodiment of the disclosure.
Figure 5:
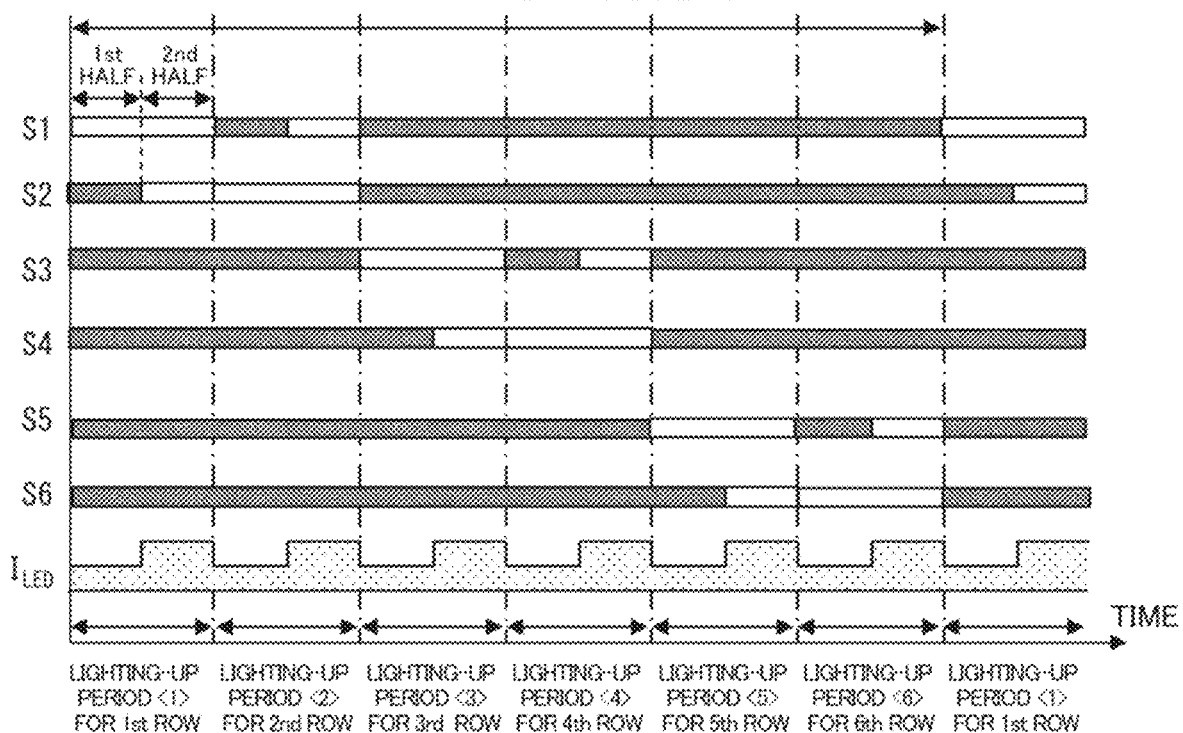
FIG. 5 illustrates a method of LED drive through division into six time slots and three-time division according to a third preferred embodiment of the disclosure.

FIG. 2, the lower part is a timing chart, which illustrates a basic driving method. As illustrated in the chart, the switches S1 to S6 sequentially repeat ON and OFF periodically within a predetermined time period (e.g., within one frame period). Here, the timing chart in the lower part of FIG. 2 focuses on one of the drivers and illustrates how the LEDs connected to the driver undergo lighting-up control. In addition, the timing chart in the lower part of FIG. 2 shows ON periods in white and OFF periods with hatched lines. FIGS. 3 to 5 are illustrated similarly.

That is, during lighting-up period <1> for the first row, only the switch S1 is turned on, and the other switches S2 to S6 are turned off. The LEDs (L1, L7, L13, . . . , L67) undergo PWM drive by the drivers D1 to D12 within lighting-up period <1>. Upon drive completion, the switch S1 is turned off.

Next, during lighting-up period <2> for the second row, only the switch S2 is turned on, and the other switches S1 and S3 to S6 are turned off. The LEDs (L2, L8, L14, . . . , L68) undergo PWM drive by the drivers D1 to D12 within lighting-up period <2>. Upon drive completion, the switch S2 is turned off.

Likewise, in lighting-up periods <3>, <4>, <5> and <6>, the switches S3 to S6 are turned on alternately, and the drivers D1 to D12 light up each area during the corresponding lighting-up period.

FIG. 2 shows that one LED for one driver remains lit up in each lighting-up period. When one feeds a current of 50 mA through each LED, each driver will supply 50 mA of current in any of the lighting-up periods. Let each area have a brightness level of 1000 cm/m$^2$ in such control. It is noted that area brightness herein refers to average brightness within one frame period. The LED in one area remains lit up during ⅙ of one frame, and the average brightness is thus ⅙ of the brightness in the lighting-up period. In reality, the value 1000 cm/m$^2$ seems to be the maximum brightness in each area of the backlight, because a current value can be changed for each driver, or the duty ratio in PWM control can be changed for each driver. This holds true for FIGS. 3 to 5.

As described, the drivers D1 to D12 in passive drive switch their driver channels on the basis of time, in each of lighting-up periods <1> to <6>, thereby capable of controlling up of more (six times more) light source areas (herein, 12×6=72 areas) than the 12 driver channels individually.

Driving Method in Three-Time Division

FIG. 3 illustrates a method of driving the LEDs 11 in three-time division according to the preferred embodiment. FIG. 3 illustrates a specific example of how to drive the LEDs 11 arranged in six rows, through division into three time slots every two rows. That is, FIG. 3 illustrates an instance where n=6, k=2, and n/k=3 are satisfied.

As illustrated in the timing chart in the lower part of FIG. 3, which illustrates a method of three-time-division drive, the switches S1 to S6 sequentially repeat ON and OFF periodically within a predetermined time period (e.g., within one frame period).

That is, during lighting-up period (1) for the first and second rows, the switches S1 and S2 are turned on, and the other switches S3 to S6 are turned off. The LEDs (L1, L2, L7, L8, . . . , L67, and L68) undergo PWM drive by the drivers D1 to D12 within lighting-up period (1). Upon drive completion, the switches S1 and S2 are turned off.

Next, during lighting-up period (2) for the third and fourth rows, the switches S3 and S4 are turned on, and the other switches S1, S2, S5 and S6 are turned off. The LEDs (L3, L4, L9, L10, . . . , L69, and L70) undergo PWM drive by the drivers D1 to D12 within lighting-up period (2). Upon drive completion, the switches S3 and S4 are turned off.

Furthermore, during lighting-up period (3) for the fifth and sixth rows, the switches S5 and S6 are turned on, and the other switches S1 to S4 are turned off. The LEDs (L5, L6, L11, L12, . . . , L71, and L72) undergo PWM drive by the drivers D1 to D12 within lighting-up period (3). Upon drive completion, the switches S5 and S6 are turned off.

FIG. 3 shows that two LEDs for one driver remain lit up in each lighting-up period. When one feeds a current of 50 mA through each LED, each driver will supply 100 mA of current, that is, k=two-fold current, in any of the lighting-up periods. The LED in one area remains lit up during ⅓ of one frame, and the average brightness is thus ⅓ of the brightness in the lighting-up period. Accordingly; the average brightness is 2000 cm/m$^2$, which is double the average brightness in the example of FIG. 2. That is, although the number of time divisions has been reduced to half, i.e., from six to three, the example of FIG. 3 achieves two times higher average brightness of each area than the example of FIG. 2.

As such, the drivers D1 to D12 in passive drive switch their driver channels on the basis of time, in each of lighting-up periods (1) to (3), thereby capable of controlling lighting-up of more (three times more) light source areas (herein, 12×3=36 areas) than the 12 driver channels individually.

As described above, the drive circuit 12 drives the LEDs 11 arranged in six rows, row by row through division into six time slots in accordance with the predetermined condition (this is a basic driving method), or every two rows through division into three time slots in accordance with the predetermined condition.

Lateral Area Drive

The upper left part of FIG. 3 illustrates two instances about lateral area drive. One of them is 36-area drive (3×12=36 areas), where the areas are divided into three time slots longitudinally and undergo independent control laterally by the drivers D1 to D12. The other is 18-area drive (3×6=18 areas), where the areas are divided into three time slots longitudinally and undergo drive laterally by two adjacent drivers using the same value. As illustrated in the upper left part of FIG. 3, the drivers D1 and D2 drive the areas using the same value; so do the drivers D3 and D4 with the same value, so do the drivers D5 and D6 with the same value, so do the drivers D7 and D8 with the same value, so do the drivers D9 and D10 with the same value, and so do the drivers D11 and D12 with the same value.

Although lateral drive of some of the LEDs 11 in a collective manner using the same value does not improve the brightness of the backlight BL, such lateral drive can bring the shape of the divided areas of the backlight BL close to a square. This can avoid an imbalance in the screen brightness of the display device 1 and an imbalance in brightness unevenness.

Second Preferred Embodiment

A second preferred embodiment of the disclosure will be described. Components having the same functions as those described in the first preferred embodiment are denoted by the same signs and will not be elaborated upon here.

The drive circuit 12 according to this preferred embodiment basically drives the LEDs 11 arranged in six rows, row by row through division into six time slots or every three rows through division into two time slots in accordance with brightness necessary for the screen of the display device 1. One can refer to the first preferred embodiment with regard to the basic driving method.

Method of Drive Through Division into Two Time Slots

FIG. 4 illustrates a method of driving the LEDs 11 through division into two time slots according to this preferred embodiment. FIG. 4 illustrates a specific example of how to drive the LEDs 11 arranged in six rows, every three rows in two divided time slots. That is, FIG. 4 illustrates an instance where n=6, k=3, and n/k=2 are satisfied.

As illustrated in the timing chart in the lower part of FIG. 4, which illustrates a method of two-time-division drive, the switches S1 to S6 sequentially repeat ON and OFF periodically within a predetermined time period (e.g., within one frame period).

That is, during lighting-up period [1] for the first, second and third rows, the switches S1 to S3 are turned on, and the other switches S4 to S6 are turned off. The LEDs (L1, L2, L3, . . . , L67, L68, and L69) undergo PWM drive by the drivers D1 to D12 within lighting-up period [1]. Upon drive completion, the switches S1 to S3 are turned off.

Next, during lighting-up period [2] for the fourth, fifth and sixth rows, the switches S4 to S6 are turned on, and the other switches S1 to S3 are turned off. The LEDs (L4, L5, L6, . . . , L70, L71, and L72) undergo PWM drive by the drivers D1 to D12 within lighting-up period [2]. Upon drive completion, the switches S4 to S6 are turned off.

FIG. 4 shows that three LEDs for one driver remain lit up in each lighting-up period. When one feeds a current of 50 mA through each LED, each driver will supply 150 mA of current, that is, k=three-fold current, in any of the lighting-up periods. The LED in one area remains lit up during ½ of one frame, and the average brightness is thus ½ of the brightness in the lighting-up period. Accordingly, the average brightness is 3000 cm/m², which is triple the average brightness in the example of FIG. 2. That is, although the number of time divisions has been reduced to ⅓, i.e., from six to two, the example of FIG. 4 achieves three times higher average brightness of each area than the example of FIG. 2.

As such, the drivers D1 to D12 in passive drive switch their driver channels on the basis of time, in each of lighting-up periods [1] and [2], thereby capable of controlling lighting-up of more (two times more) light source areas (herein, 12×2=24 areas) than the 12 driver channels individually.

Lateral Area Drive

The upper left part of FIG. 4 illustrates two instances about lateral area drive. One of them is 24-area drive (2×12=24 areas), where the areas are divided into two time slots longitudinally and undergo independent control laterally by the drivers D1 to D12. The other is 8-area drive (2×4=8 areas), where the areas are divided into two time slots longitudinally and undergo drive laterally by three adjacent drivers using the same value. As illustrated in the upper left part of FIG. 4, the drivers D1, D2 and D3 drive the areas using the same value; so do the drivers D4, D5 and D6 with the same value, so do the drivers D7, D8 and D9 with the same value, and so do the drivers D10, D11 and D12 with the same value.

Although lateral drive of some of the LEDs 11 in a collective manner using the same value does not improve the brightness of the backlight BL, such lateral drive can bring the shape of the divided areas of the backlight BL close to a square. This can avoid an imbalance in the screen brightness of the display device 1 and an imbalance in brightness unevenness.

Third Preferred Embodiment

A third preferred embodiment of the disclosure will be described. Components having the same functions as those described in the first and second preferred embodiments are denoted by the same signs and will not be elaborated upon here.

The drive circuit 12 according to this preferred embodiment drives the LEDs 11 arranged in n rows (n is an integer equal to or greater than two) row by row through division into n time slots during a part of a predetermined time period, and every k rows (k is an n's divisor equal to or greater than two and is smaller than n) through division into n/k time slots during the other part of the predetermined time period.

This configuration, which provides a time period for driving the LEDs 11 every multiple rows as well as a time period for driving the LEDs 11 row by row, enables the backlight BL to light up brightly.

Method of Drive Through Division into Six Time Slots and Division into Three Time Slots FIG. 5 illustrates a method of driving the LEDs 11 through division into six time slots and division into three time slots according to this preferred embodiment. As illustrated in FIG. 5, the drive circuit 12 drives the LEDs 11 arranged in six rows, row by row through division into six time slots during the first half (1st half) of a predetermined time period in accordance with brightness necessary for the screen of the display device 1, and every two rows through division into three time slots during the latter half of the predetermined time period.

Like the basic driving method in FIG. 2, the drive circuit 12 performs six-time-division drive during the first half of each (predetermined time period) of lighting-up periods <1> to <6> to drive the LEDs 11 row by row, as illustrated in the timing chart of FIG. 5. Like the three-time-division drive in FIG. 3, the drive circuit 12 then performs three-time-division drive during the latter half of each (predetermined time period) of lighting-up periods <1> to <6> to drive the LEDs 11 every two rows. For instance, the drive circuit 12 sets a 50-to-50 ratio between the driving period for six-time division and the driving period for three-time division in a predetermined time period. It is noted that the driving period for six-time division and the driving period for three-time division may be provided in reverse order.

It is also noted that the drive circuit 12 may change the foregoing method of driving the light-emitting elements so as to change a part of the predetermined time period and the other part of the same in accordance with a predetermined condition. That is, the drive circuit 12 may change the ratio between the driving period for six-time division and the driving period for three-time division in the predetermined time period to a ratio other than a 50-to-50 ratio.

$I_{LED}$ at the bottom of the timing chart of FIG. 5 indicates the volume of current flowing through a certain driver. For easy description, let each LED 11 be lit up at maximum brightness. When the current flows at a volume of 1 during six-time-division drive in the first half of each (predetermined time period) of lighting-up periods <1> to <6>, the current flows at a volume of 2 during three-time-division drive in the latter half of each (predetermined time period) of lighting-up periods <1> to <6>. That is, the volume of current flowing through a certain driver can have two values within a predetermined time period. When the ratio of driving period between six-time division and three-time division is 50 to 50 for instance, the average volume of current is 1.5, and the average brightness is 1.5 times higher. When the ratio is 100 to 0, the average brightness is 1.0 times higher. When the ratio is 0 to 100, the average brightness is 2.0 times higher. As such, the drive circuit 12 according to the third preferred embodiment can change the average brightness in a predetermined time period by changing the ratio of driving period between six-time division and three-time division.

This configuration can get the best of both artificial-time-division variable area drive, consisting of a combination of n-time-division drive and n/k-time-division drive, and brightness. That is, when the number of divisions is not changed alter lately timewise, the number of (in-plane) divisions settable in local dimming is set to a discrete value, and so is the maximum brightness. In contrast, changing the number of time divisions alternately enables an artificial intermediate setting in each of brightness setting and (in-plane) division setting, which are discrete when the number of time divisions is not changed alternately, thereby achieving a maximum artificial number of (in-plane) divisions while satisfying requirements for the brightness. Locations where a PWM signal of the backlight BL has a large duty ratio are driven in areas having a low screen brightness level. Locations where the PWM signal of the backlight BL has a small duty ratio are driven in areas having a high screen brightness level.

With reference to FIG. 5, the following specifically describes an intermediate setting in the division setting. The drive circuit 12 changes the ratio of driving period between the six-time division of 6×12=72 areas (one area consists of L1, L2, . . . ) and the three-time division of 3×12=36 areas (one area consists of L1+L2, L3+L4, . . . ).

In two driving methods, i.e., six-time division and three-time division, the number of in-plane divisions can be set to only areas of discrete value, such as 72 areas or 36 areas, when the number of divisions in each method is not changed timewise.

By contrast, changing the ratio of driving period between six-time division and three-time division and changing the number of time divisions alternately, as described above, enables setting of an artificial number of (in-plane) divisions between 72 areas and 36 areas.

In other words, setting of changing the number of time divisions alternately in this case refers to setting the number of in-plane divisions to an intermediate value, that is, setting the number of in-plane divisions to a value between 72 areas and 36 areas, whereas the number of in-plane divisions is originally set to one of 72 areas and 36 areas.

Even when a backlight with 72 divided areas has a maximum brightness level of 1000 cm/m$^2$, and a backlight with 36 divided areas has a maximum brightness level of 2000 cm/m$^2$, artificially setting in-plane divisions enables setting of a maximum brightness level between these values.

For a 50:50 ratio of driving period between six-time division and three-time division, the maximum backlight brightness is 1500 cm/m$^2$, which is an intermediate value between the maximum brightness of the backlight with 72 divided areas and the maximum brightness of the backlight with 36 divided areas.

Although the drive circuit 12 according to the third preferred embodiment establishes a driving period for six-time division and a driving period for three-time division within a predetermined time period, as described above, the drive circuit 12 may perform drive in combination with any types of time division other than the foregoing. Furthermore, the drive circuit 12 may perform drive in combination with a method of driving some of the LEDs 11 laterally in a collective manner using the same value. For instance, the drive circuit 12 may establish, within a predetermined time period, a driving period for three-time division with 3×6=18 divided areas, as illustrated in FIG. 3, and a driving period for two-time division with 2×4=8 divided areas, as illustrated in FIG. 4. That is, the drive circuit 12 may establish a driving period for n-time division (n is an integer equal to or greater than two) and a driving period for n/k-time division (k is an n's divisor equal to or greater than two and is smaller than n) within a predetermined time period.

In such two driving methods, i.e., three-time division and two-time division, the number of in-plane divisions can be set to only areas of discrete value, such as 18 areas or 8 areas, when the number of divisions in each method is not changed timewise.

By contrast, changing the ratio of driving period between three-time division and two-time division and changing the number of time divisions alternately, as described above, enables setting of an artificial number of (in-plane) divisions between 18 areas and 8 areas.

In other words, setting of changing the number of time divisions alternately in this case refers to setting the number of in-plane divisions to an intermediate value, that is, setting the number of in-plane divisions to a value between 18 areas and 8 areas, whereas the number of in-plane divisions is originally set to one of 18 areas and 8 areas.

Even when a backlight with 18 divided areas has a maximum brightness level of 2000 cm/m$^2$, and a backlight with 8 divided areas has a maximum brightness level of 3000 cm/m$^2$, artificially setting in-plane divisions enables setting of a maximum brightness level between these values.

For a 50:50 ratio of driving period between three-time division and two-time division, the maximum backlight brightness is 2500 cm/m$^2$, which is an intermediate value between the maximum brightness of the backlight with 18 divided areas and the maximum brightness of the backlight with 8 divided areas.

Examples of Predetermined Condition for Changing Driving Method

The following describes examples of the predetermined condition where the controller 13 changes the driving method in the display device 1.

First Example

The following describes a first example, where an operation is performed to change the brightness level of the screen of a mobile apparatus, which is herein the display device 1. The controller 13 in this case changes the setting on the drive circuit 12 in accordance with the brightness level. For instance, let the screen brightness be settable from Level 1, which is the darkest, to Level 10, which is the brightest.

The controller 13 can set drive by division into 72 areas (six-time-division drive), as illustrated in FIG. 2, when the screen brightness is set at Levels 1 to 6 for instance. The backlight in this case has a maximum brightness level of 1000 cm/m$^2$, as illustrated in FIG. 2.

Moreover, the controller 13 can set drive by division into 36 areas (three-time-division drive), as illustrated in FIG. 3, when the screen brightness is set at Levels 7 to 9 for instance. The backlight in this case has a maximum brightness level of 2000 cm/m$^2$, as illustrated in FIG. 3.

Moreover, the controller 13 can set drive by division into 24 areas (two-time-division drive), as illustrated in FIG. 4, when the screen brightness is set at Level 10 for instance. The backlight in this case has a maximum brightness level of 3000 cm/m$^2$, as illustrated FIG. 4.

That is, the controller 13 changes the setting on the drive circuit 12 in such a manner that the number of time divisions in passive drive decreases along with level increase in the screen brightness, and that the backlight brightness increases along with level increase in the screen brightness. The drive circuit 12 thus changes the method of driving the LEDs 11, in accordance with the setting of the screen brightness of the display device 1.

This configuration, which includes changing the method of driving the LEDs 11 in accordance with the setting of the screen brightness of the display device 1, enables selection of a suitable number of time divisions.

It is noted that a user, for instance, can change the setting of the screen brightness of the display device 1. It is also noted that the display device 1 can include an external-light sensor for instance, and that the display device 1 can control its screen brightness in such a manner that the brightness gets higher along with increase in the intensity of external light in response to the result of detection in the external-light sensor.

Second Example

The following describes a second example, where the mobile apparatus uses an application. The controller 13 in this case changes the setting on the drive circuit 12 in accordance with a screen brightness level necessary for the application.

The controller 13 can set drive by division into 72 areas (six-time-division drive), as illustrated in FIG. 2, when a document creation application is used for instance. This is because that document creation seems not to require such a high level of screen brightness. The backlight in this case has a maximum brightness level of 1000 cm/m$^2$, as illustrated in FIG. 2.

Moreover, the controller 13 can set drive by division into 36 areas (three-time-division drive), as illustrated in FIG. 3, when an application for displaying a still picture is used for instance. This is because that a still picture has a large dynamic range of light and dark within the image and seems to require a high level of screen brightness to a certain extent. The backlight in this case has a maximum brightness level of 2000 cm/m$^2$, as illustrated in FIG. 3.

Moreover, the controller 13 can set drive by division into 24 areas (two-time-division drive), as illustrated in FIG. 4, when an application for displaying a moving picture, a movie, and other contents is used for instance. This is because that a moving picture and a movie seem to involve a large difference between light and dark not only within one frame but also depending on scenes, and that these contents seem to require a further high level of screen brightness. The backlight in this case has a maximum brightness level of 3000 cm/m$^2$, as illustrated in FIG. 4.

That is, the controller 13 changes the setting on the drive circuit 12 in such a manner that the number of time divisions in passive drive decreases along with increase in the level of screen brightness necessary for an application, and that the backlight brightness increases along with increase in the level of screen brightness necessary for the application. The drive circuit 12 changes the method of driving the LEDs 11, in accordance with an application used in the display device 1.

This configuration, which includes changing the method of driving the LEDs 11 in accordance with an application used in the display device 1, enables selection of a suitable number of time divisions.

Third Example

The following describes a third example, where the controller 13 changes the setting on the drive circuit 12 in accordance with the power source status of the mobile apparatus.

The controller 13 can set drive by division into 72 areas (six-time-division drive), as illustrated in FIG. 2, when the battery has little power left for instance. The backlight in this case has a maximum brightness level of 1000 cm/m$^2$, as illustrated in FIG. 2.

Moreover, the controller 13 can set drive by division into 36 areas (three-time-division drive), as illustrated in FIG. 3, when the battery has much power left for instance. The backlight in this case has a maximum brightness level of 2000 cm/m$^2$, as illustrated in FIG. 3.

Moreover, the controller 13 can set drive by division into 24 areas (two-time-division drive), as illustrated in FIG. 4, during connection to an AC adapter for instance. The backlight in this case has a maximum brightness level of 3000 cm/m$^2$, as illustrated in FIG. 4.

That is, the controller 13 changes the setting on the drive circuit 12 in such a manner that the number of time divisions in passive drive decreases along with increase in the remaining power of the power source, and that the backlight brightness increases along with increase in the remaining power of the power source. The drive circuit 12 changes the method of driving the LEDs 11, in accordance with the power source status of the display device 1.

This configuration, which includes changing the method of driving the LEDs 11 in accordance with the power source status of the display device 1, enables selection of a suitable number of time divisions.

As described in the foregoing operation outline of the drive circuit 12, reducing the number of time divisions in passive drive enables the LEDs 11, and by extension, the backlight BL to be lit up N times more brightly. The reduction also enables a suitable brightness level and a suitable number of divisions to be selected in accordance with a screen brightness level, an application that is used, and a power source status.

Examples Implemented by Software

The controller 13 of the display device 1 may be implemented by a logic circuit (hardware) formed in, for instance, an integrated circuit (IC chip) or by software.

For software, the display device 1 includes a computer that executes commands of a program, which is software for implementing each function. The computer includes, for instance, at least one processor (controller) and at least one computer-readable recording medium storing the program. The processor in the computer reads the program from the recording medium and executes the program to thus achieve the object of the disclosure. An example of the processor usable is a central processing unit (CPU). An example of the recording medium usable is a non-transitory tangible medium, including a read only memory (ROM), a tape, a disk, a card, a semiconductor memory, and a programmable logic circuit. The computer may also include other components, such as a random access memory for developing the program. The program may be supplied to the computer via any transmission medium (e.g., a communication network or broadcasting wave) capable of transmitting the program. One aspect of the disclosure can be implemented also in the form of a data signal in which the program is embodied by electronic transmission and that is embedded in a carrier wave.

The display device according to each aspect of the disclosure may be implemented by a computer. In this case, the scope of the disclosure includes a control program of the display device that is provided for operating the computer as each unit (software components) of the display device to implement the display device using the computer. The scope also includes a computer-readable recording medium recording the control program.

The disclosure is not limited to the foregoing preferred embodiments. Numerous modifications can be devised within the scope of the claims. The technical scope of the disclosure includes as well a preferred embodiment that is obtained in combination, as appropriate, with technical means disclosed in respective different preferred embodiments. Furthermore, combining the technical means disclosed in the respective preferred embodiments can provide a new technical feature.

What is claimed is:

1. A display device comprising:
light-emitting elements disposed in a backlight divided into a plurality of areas, the light-emitting elements being arranged in a plurality of rows and a plurality of columns so as to correspond to the plurality of respective areas; and
a driver configured to sequentially drive the light-emitting elements in one or more rows every predetermined time period that has undergone time division from one frame period, the one frame period being a time period during which the display device displays one frame of an image,
wherein the driver drives the light-emitting elements arranged in n rows by using a driving method based on a predetermined condition, the driving method including driving the light-emitting elements row by row through division into n time slots, or driving the light-emitting elements every k rows through division into n/k time slots, where n is an integer equal to or greater than two, where k is an n's divisor equal to or greater than two and is smaller than n.

2. The display device according to claim 1, wherein the driver changes the driving method in accordance with a setting of a screen brightness level of the display device.

3. The display device according to claim 1, wherein the driver changes the driving method in accordance with an application used in the display device.

4. The display device according to claim 1, wherein the driver changes the driving method in accordance with a power source status of the display device.

5. The display device according to claim 1, wherein the driver further drives the light-emitting elements every multiple columns when driving the light-emitting elements every k rows through the division into n/k time slots, where k is an n's divisor equal to or greater than two and is smaller than n.

6. A display device comprising:
light-emitting elements disposed in a backlight divided into a plurality of areas, the light-emitting elements being arranged in a plurality of rows and a plurality of columns so as to correspond to the plurality of respective areas; and
a driver configured to sequentially drive the light-emitting elements in one or more rows every predetermined time period that has undergone time division from one frame period, the one frame period being a time period during which the display device displays one frame of an image,
wherein the driver drives the light-emitting elements arranged in n rows by using a driving method, the driving method including driving the light-emitting elements row by row through division into n time slots during a part of the predetermined time period, and driving the light-emitting elements every k rows through division into n/k time slots during the other part of the predetermined time period, where n is an integer equal to or greater than two, where k is an n's divisor equal to or greater than two and is smaller than n.

7. The display device according to claim 6, wherein the driver changes the driving method so as to change the part and other part of the predetermined time period in accordance with a predetermined condition.

8. The display device according to claim 7, wherein the driver changes the driving method in accordance with a setting of a screen brightness level of the display device.

9. The display device according to claim 7, wherein the driver changes the driving method in accordance with an application used in the display device.

10. The display device according to claim 7, wherein the driver changes the driving method in accordance with a power source status of the display device.

11. The display device according to claim 7, wherein the driver further drives the light-emitting elements every multiple columns when driving the light-emitting elements every k rows through the division into time slots, where k is an n's divisor equal to or greater than two and is smaller than n.

* * * * *